Figure 1:
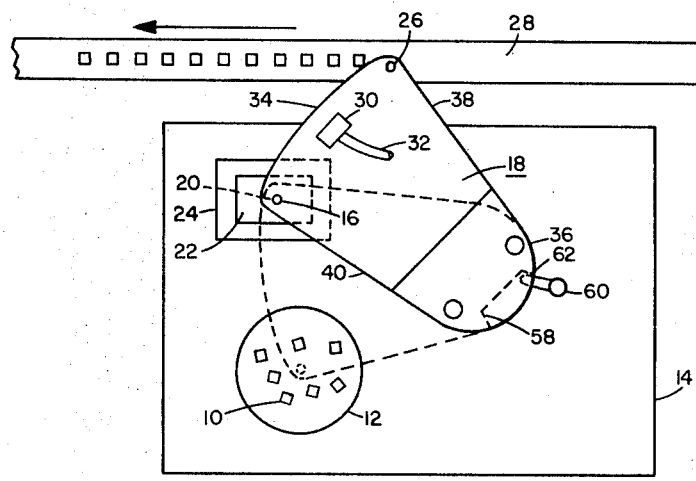

United States Patent

[11] 3,581,911

[72] Inventor Lee Edward Folk
 Phoenix, Ariz.
[21] Appl. No 841,849
[22] Filed July 15, 1969
[45] Patented June 1, 1971
[73] Assignee Motorola Inc.
 Franklin Park, Ill.

[54] DIE-POSITIONING MECHANISM
 7 Claims, 4 Drawing Figs.
[52] U.S. Cl. ................................................. 214/1
[51] Int. Cl. ........................................... B65h 11/02
[50] Field of Search ................................... 214/1B53,
 1B52, 1B5, 1B54, 1B3, 1B4

[56] References Cited
UNITED STATES PATENTS
2,974,811 3/1961 Dammert ............... 214/1(B3)
3,479,716 11/1969 Zanger ................. 214/1(BS2)X Primary Examiner—Gerald M. Forlenza
Assistant Examiner—George F. Abraham
Attorney—Mueller and Aichele ABSTRACT: A machine is disclosed for taking thin dies of very small size out of a container where they are randomly oriented, placing them at an orienting position and orienting them, and then placing them at a work or other desired position, all oriented in a desired manner.

PATENTED JUN 1 1971

3,581,911

INVENTOR.
Lee Edward Folk

BY Mueller, Aichele & Raimer
ATTY'S.

DIE-POSITIONING MECHANISM

BACKGROUND

In the electronic field, a great deal of circuitry may be placed on a substrate of a predetermined shape such as a rectangular disc shape. The resultant die, which may be very thin and which may be about one sixteenth of an inch square, are mass-produced. When packaged or when used as a component of an assembly of elements, the die must be properly oriented. Mechanical orientation of a die is quicker, more accurate, and more economical than manual orientation thereof.

SUMMARY

The dies to be oriented are put into a storage container, no attempt being made to orient them while in the container. In accordance with a preferred embodiment of the invention, two spaced vacuum quills are moved up and down and laterally. One quill is over the storage container while the other quill is over an orienting plate. The orienting plate has a truncated pyramidal depression in the top thereof, the top of the depression being similar in shape to the die but larger in lateral dimensions. The bottom of the depression is also similar in shape to the die but smaller in lateral dimensions. The orienting plate is positioned on a vibrator. The quills come down, the suction is turned on whereby the first quill picks up a randomly oriented die out of the container and the second quill picks up a properly oriented die out of the pyramidal depression. The quills go up and are moved so the first quill is over the orienting plate and the second quill is over the work or other desired deposit position. The quills come down again, the suction is turned off and the first quill drops an unoriented die into the depression in the orienting plate and the second die drops from its quill in an oriented manner at the desired deposit position. The quills go back to their first position and the suction is turned on whereby the first quill picks up another unoriented die and the second quill picks up another oriented die. The quills then go to their second position and the first quill drops its die into the depression and the second quill drops its die at the desired deposit position for oriented dies. If desired, one quill may be used as a positioner, that is either quill may pick up a die or any other object that is to be moved and move it accurately to another position.

DESCRIPTION

Figure 2:
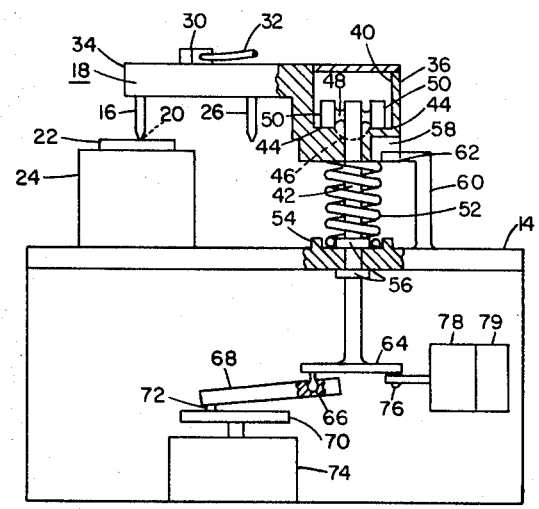
Figure 3:
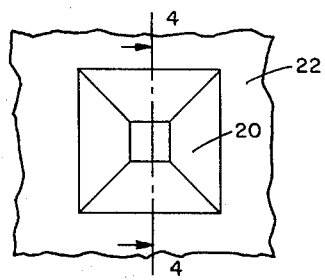
Figure 4:
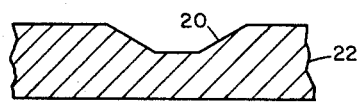

The invention may be better understood upon reading the following description in connection with the accompanying drawing in which FIG. 1 is a plan view of the orientor and positioner of this invention, FIG. 2 is a side elevational view, with parts broken away to show internal mechanism, of the orientor and positioner of FIG. 1, FIG. 3 is a plan view of a portion of the orienting plate of FIGS. 1 and 2, and FIG. 4 is a sectional view on the line 4—4 of the portion of the orienting plate shown in FIG. 3.

Turning first to FIG. 1, dies or other articles 10 which are shown as being rectangular in the top view, are placed in a random manner in a dish or container 12 which is itself placed on a table 14. As will be explained, the vacuum quill 16 which is mounted on an oscillating arm 18, carries a die 10 from the plate 12 and positions it in the depression 20 (see FIGS. 3 and 4) which is formed in the top of an orienting plate 22. The plate is mounted on a vibrator 24 which is itself mounted on the table 14. The die 10 that is in the depression 20 will be oriented, as will be explained and another vacuum quill 26, which is also mounted on the arm 18 will pick up the oriented die 10 and carry it to a desired deposit position such as the conveyor belt 28. The belt 28 may carry headers, not shown, on which the dies 10 are positioned to be bonded thereto. In the meantime, the quill 16 is carrying another unoriented die 10 and placing it in the depression 20 to be oriented.

The quills 16 and 20 are hollow needles with pointed lower tips which have holes (not shown) through the tips. The hollows of the quills 16 and 20 are connected by suitable tubing to a fitting 30 and a vacuum or suction hose 32 is fitted to the fitting 30. When suction is applied to the hose 32, air rushes into the pointed tips of the quills 16 and 26 and lifts any die 10 that is near the tip of the quills 16 or 26 and holds it or them on the tips of the quills 16 and 26. These quills 16 and 26 are mounted on the arm 18 so as to be slidable with respect to arm 18 in the direction of their own length, they being adjustably spring biassed in a downward direction, and means are provided to prevent rotation of the quills 16 and 26 with respect to the arm 18.

One end 34 of the arm 18 is wider than the other end 36. The ends 34 and 36 may be rounded. The sides 38 and 40 of the arm 18 diverge from the end 36 towards the end 34. The quill 16 is mounted in the manner noted above on the underside of the arm 18 and in the corner made by the side 40 and the rounded end 34, and the other quill 26 is similarly mounted on the underside of the arm 18 and in the corner made by the side 38 of the end 34. The fitting 30 may extend out of the top of the arm 18.

The upper part of the end 36 of the arm 18 is hollowed out to form a cavity 40. The lower part of the end 36 of the arm 18 is formed into a bearing for receiving a shaft 42. The floor of the cavity 40 is cam shaped as shown, portions 44 of this floor being higher than portions 46 (only one portion 46 being shown). A cross-shaft 48 is fixed to the shaft 42 and rollers 40 rotate on the cross-shaft 48. A compression spring 52 bears between the bottom of the end 36 and the top of the table 14, whereby the arm 18 is raised by the spring 52 as high as the floor portions 44 and 46 and the rollers 50 will permit. A spring-positioning collar 54 may be provided on the table 14 and around the spring 52. The shaft 42 extends through a bearing in the tabletop 14 and collars 56 are fixed to the shaft 42 to prevent the shaft 42 from sliding with respect to the tabletop 14. A stop groove or cavity 58 is formed in the lower end 36 of the arm 18 and a stop means 60 which is fixed to the tabletop 14 has a finger 612 which extends into the stop cavity 58 to limit oscillation of the arm 18 as will be explained.

The lower end of the shaft 42 has a disc 64 fixed to it. A ball element 66 projects from the bottom end of the disc 64. One end of a link 68 is fixed to the ball element 66, that end being broken away to show the ball element 66. The other end of the link 68 is linked to a rotary disc 70 by another ball element 72, only a portion of which is shown. A motor 74 rotates the disc 70. Since the throw of the link 68 is short compared to the diameter of the disc 64, the disc 64 rotates less than 360° in one direction and then rotates less than 360° back as the disc 70 rotates continuously in one direction. During the last part of the rotation in each direction of the disc 64, the arm 18 is prevented from rotation but it moves up and down as will be explained. During this last part of its rotation in each direction, a stop 76 mounted on the disc 64 moves an arm of an electrical switch 78 which operates a valve 79 to cause the suction to be applied or not applied to the hose 32 as will be further explained.

Turning to FIGS. 3 and 4, it will be seen that the depression 20 in the orienting plate 22 is of rectangular inverted truncated pyramidal form. That is, the top of the depression is of the same shape as the flat bottom thereof and the sides of the depression slant inwardly and downwardly. In this manner, a rectangular die 10 will fit in the depression 20 with the corners of the die in the corners of the depression whereby the die 10 will be oriented by the plate 22 having the depression 20 therein. Since the plate 20 is mounted on a vibrator 24, the die 10 which is dropped into depression 22 by the quill 16 is soon oriented ky this vibration of the plate 22. If dies of other shapes are to be oriented, the shape of the depression 20 will be shaped accordingly.

The operation of the orienting and transporting mechanism will now be described. The motor 74 rotates continuously, causing the disc 70 to rotate. However, as noted above, the disc 64 does not rotate through 360° but oscillates through less than 360°. As the disc 64 oscillates, it carries the shaft 42 with it, also carrying the axle 48 on which the rollers 50 turn with it. The arm 18 is also carried with the shaft 42 as far as the stop finger 62, which cooperates with the stop groove 58, will permit. When the stop finger 60 hits an edge, in the illustration shown, the counterclockwise edge, of the groove 58, the arm 18 can rotate no further in a clockwise direction. However, the shaft 42 continues to rotate in the clockwise direction, whereby the rollers 50 ride up out of the low parts 46 of the floor of the cavity onto the high parts 44 (as shown), carrying the arm 18 down and compressing the spring 52. Furthermore, the stop 76 on the disc 64 hits the arm of the switch 78, causing the suction on the hose 32 to go off. The quills 16 and 26 drop the dies 10 that they are holding. Since the quills 16 and 26 are slidably mounted, they do not injure the dies 10. The quill 26 drops its die in an oriented manner on the conveyor belt 28 or other depositing position. The belt 28 moves to the left as viewed in FIG. 1. The quill 16 drops its die into the cavity 20 on the plate 22. The plate 22 is being vibrated by the vibrator 24 and it very quickly orients the die which is placed in the cavity 20 as noted above. The motion of the quills is straight up and down since the end walls of the cavity 58 are straight up and down.

The disc 64 rotates in the opposite direction, and the shaft 42 and the axle 48 on which the rollers 50 are fixed to rotate with it. The rollers 50 roll down into the low parts 46 of the floor of the cavity and the arm 18, carrying the quills 16 and 26, goes up. Since the suction is off, the dies 10 are left where they fell. The disc 64 continues to rotate counterclockwise, carrying the arm 18, in its high position, with it until the stop finger 62 hits the clockwise edge of the cavity 58 and the arm 18 stops rotating counterclockwise and the rollers 50 roll up on the high parts 44 of the floor of the cavity 40, forcing the arm 18 down and carrying the quills with it. The suction is turned on by the stop 76 hitting the control arm of the switch 76 (or a lateral extension of the control arm). The quill 16 is now over the container 12 and picks up an unoriented die 10 and the quill 26 is now over the depression 20 and picks up an oriented die 10. The direction of rotation of the disc 64 is again reversed and the quills 16 and 26 carry their respective dies clockwise and the cycle continues.

What I claim is:

1. An article-transporting means comprising,
a shaft,
means for oscillating said shaft about an axis,
an arm carried on said shaft in a rotatable and slidable manner, said shaft extending into an end portion of said arm,
there being a cavity in said end portion of said arm at least partially surrounding said shaft and having a floor,
a portion of said floor being high and a portion of said floor being low,
means fixed to said shaft for movement therewith and adapted for bearing on said floor,
resilient means urging said floor against said means fixed to said shaft, and
stop means for stopping the rotation of said arm, whereby said arm rotates with said shaft until the rotation of said arm is stopped by said stop means and whereby upon continued rotation of said shaft said arm moves in a direction along said axis.

2. The invention of claim 1 including a quill extending from said arm parallel to said shaft.

3. The invention of claim 2 in which said quill is hollow and means are provided to apply suction to said quill in response to said shaft in its rotation reaching a predetermined position and for discontinuing application of suction to said quill in response to said shaft reaching a predetermined other position.

4. The invention as expressed in claim 1 in which two quills extend from said arm parallel to said shaft and spaced from each other, in which said quills are hollow and means are provided to apply suction to said quills in response to said shaft in its rotation reaching a predetermined position and for discontinuing said application of suction to said quills in response to said shaft reaching a predetermined other position and also including an article storage, an article-orienting and an article-depositing position, one of said quills moving from said article storage means to said article-orienting position and back as said arm oscillates and said other quill moving from said article-orienting to said article-depositing position and back as said arm oscillates.

5. The invention as expressed in claim 4 in which said article-orienting means comprises a plate having a surface with a depression extending into said plate through said surface, said depression being of pyramidal form, the larger dimensions of said depression being in the plane of said surface and the dimensions of said depression becoming smaller in a direction away from said surface.

6. The invention of claim 5 including means to vibrate said plate.

7 An article-transporting and -orienting means comprising,
a plate having a surface with a depression extending into said plate through said surface,
said depression being of pyramidal form,
the larger dimensions of said depression being in the plane of said surface, and the dimensions of said depression becoming smaller in a direction away from said surface, and
means to pick up an article to be oriented, to move said article to a point over said depression and to drop said article into said depression,
said means to pick up and drop said article comprising a hollow quill and means to apply and to discontinue the application of suction to said quill,
including an additional means to pick up articles out of said depression and move them to another position,
further including a shaft,
means to oscillate said shaft about an axis,
an arm carried on said shaft in a rotatable and slidable manner,
said shaft extending into an end portion of said arm,
there being a cavity in said end portion of said arm at least partially surrounding said shaft and having a floor,
a portion of said floor being high and a portion of said floor being low,
a means fixed to said shaft for movement therewith and adapted for bearing on said floor,
resilient means urging said floor against said means fixed to said shaft,
stop means for stopping the rotation of said arm, whereby said arm rotates with said shaft until the rotation of said arm is stopped by said stop means and whereby upon continued rotation of said shaft said arm moves in a direction along said axis,
said means to pick up and to drop articles and said additional means to pick up articles out of said depression comprising quills extending from said arm and spaced from each other.